S. T. CARTER.
Churn Motor.
No. 231,534. Patented Aug. 24, 1880.
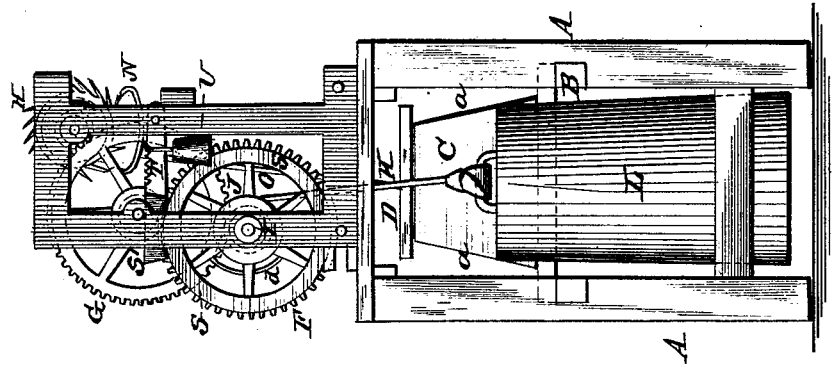
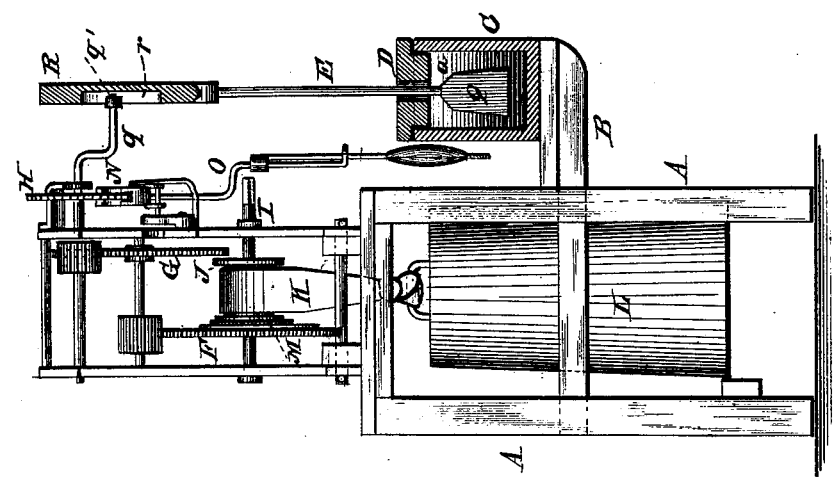
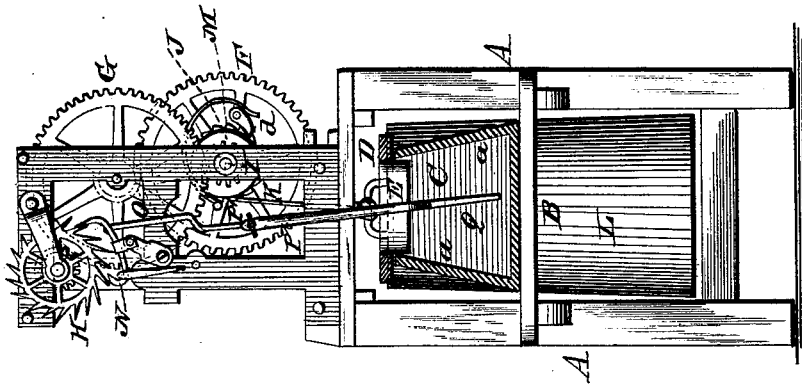
Witnesses: Inventor.
P. C. Dieterich. Samuel T. Carter,
A. W. Bright. By Leggett & Leggett,
Attys.

UNITED STATES PATENT OFFICE.

SAMUEL T. CARTER, OF TAMA CITY, IOWA.

CHURN-MOTOR.

SPECIFICATION forming part of Letters Patent No. 231,534, dated August 24, 1880.

Application filed January 31, 1880.

*To all whom it may concern:*

Be it known that I, SAMUEL T. CARTER, of Tama City, in the county of Tama and State of Iowa, have invented certain new and useful Improvements in Churn-Motors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in churn-motors, the object being to provide a cheap and effective motor for churns, that the operation of churning may be performed without the necessity of a personal attendant; and to this end my invention consists in certain details of construction and arrangement of parts in a churn-motor, as will hereinafter be described, and pointed out in the claim.

In the accompanying drawings, Figure 1 is a side elevation of my improved churn-motor, and Fig. 2 is a similar view of a modification, and Fig. 3 shows the churn-motor having a regulating-brake applied thereto.

A represents a suitable frame having a platform, B, projecting laterally therefrom, on which is placed or suitably secured an elongated churn-receptacle, C, having outwardly-flaring ends $a$ $a$, to prevent the cream from being thrown or splashed over the top of the receptacle.

D is a cover removably secured to the top of the churn, and provided with an elongated slot for the admission and operation of the dasher-rod E, as will hereinafter be described.

Mounted on the frame A is a train of gearing, consisting of the main wheel F, second wheel, G, and crown-wheel H, the shafts to which the wheels are secured being provided with suitable pinions, with which the wheels mesh or engage, so that rotary movement applied to the shaft of the main wheel F will be transmitted to the shaft on which the crown-wheel H is secured.

The main winding-shaft I is preferably provided with a drum, J, to which is made fast one end of a cord, chain, or metallic ribbon, K, the opposite and free end of which is secured to a weight, L, which latter may be made adjustable in any desired manner, either by employing a rod and using slotted weights, to be applied or removed as desired, or by using an open box and placing any desired weight therein, the box being attached to the lower and free end of strap or ribbon K by means of a bail or other suitable devices.

To the winding-shaft I is rigidly secured a ratchet, M, while the main wheel F is provided with a spring-pressed pawl, $d$, which engages with the teeth of said ratchet in one direction, and thus allows the weight to be wound up on the shaft, and the latter locked to the main wheel to revolve the same as the weight descends.

Below the crown-wheel H is pivoted the verge N, the latter being provided with a clutch-rod, O, which projects downwardly, and has secured to its lower end the upper end of the tubular dash-rod P, by a set-screw, P', or other equivalent device. Q is the churn-dash, which is attached to or formed integral with the dash-rod.

When the ribbon or strap to which the weight is secured is wound upon the shaft a rotary motion will be imparted to the crown-wheel, which in turn imparts an oscillating movement to the verge, which latter movement is transmitted to the churn-dash; and hence the motor being once set in motion, the operation of churning is effected by the motor without the necessity of any attendant being present to superintend the work.

Instead of attaching the dash to the lower end of the clutch-rod O, an ordinary pendulum-weight might be secured thereto and serve to regulate the speed of the motor, while the shaft to which the crown-wheel is attached may be constructed to project outwardly, and be fashioned into crank form, as shown in Fig. 2.

In such construction the wrist-pin $q$ is preferably provided with a roller, $q'$, which engages in the elongated slot $r$, formed in the cross-head R, to which the dasher-rod is secured. The latter insures a reciprocating movement of the churn-dasher instead of an oscillating movement, as hereinbefore set forth.

When the dasher is connected directly with the lower end of the clutch-rod an adjustable brake may be employed to regulate the speed of the motor, as illustrated in Fig. 3, wherein the second wheel of the train of gearing is provided with an outwardly-projecting flange, S, upon which rests the brake-shoe S', the latter being attached to the pivoted brake-lever T.

The brake-lever is provided with any desired number of notches for the adjustment of the weight U. By varying the position of the weight U on the lever the friction on the second wheel may be varied at pleasure, and thus a constant force may be exerted on the churn-dasher throughout the unwinding of the strap to which the weight is secured.

Having fully described my invention, what I claim as new, and desire to secure by Letters Patent, is—

The combination, with a stationary churn-body provided with a detachable cover having an opening therein, of the dasher-rod E, crank $q$, anti-friction roller $q'$, and frame R, provided with a slot, $r$, substantially as set forth.

In testimony that I claim the foregoing I have hereunto set my hand this 12th day of December, 1879.

SAMUEL TALOR CARTER.

Witnesses:
A. W. GUERNSEY,
WILLIAM RANDOLPH.